United States Patent [19]

Wahi et al.

[11] Patent Number: 4,899,372
[45] Date of Patent: Feb. 6, 1990

[54] MULTI USE TELEPHONE EXTENSION CONTROL CIRCUIT AND DEVICE PROVIDING LOCKOUT FOR PRIVACY

[75] Inventors: Ashok L. Wahi, Somerville, N.J.; Priya Jakatdar, Branford, Conn.

[73] Assignee: Better Communications, Inc., Somerville, N.J.

[21] Appl. No.: 141,106

[22] Filed: Jan. 5, 1988

[51] Int. Cl.[4] .............................................. H04M 1/70
[52] U.S. Cl. .................................. 379/184; 379/168; 379/194; 379/387
[58] Field of Search ............... 379/161, 168, 169, 184, 379/194, 199, 387; 340/825.5, 825.51

[56] References Cited

U.S. PATENT DOCUMENTS

| | | | |
|---|---|---|---|
| 3,870,831 | 3/1975 | McCarly | 179/99 |
| 3,939,311 | 2/1976 | Smith | 179/81 R |
| 4,243,844 | 1/1981 | Waldman | 179/81 R |
| 4,588,864 | 5/1986 | Carter et al. | 179/99 H |
| 4,647,723 | 3/1987 | Voorhies | 379/381 |
| 4,747,128 | 5/1988 | Chan et al. | 379/194 |

Primary Examiner—Stafford D. Schreyer
Attorney, Agent, or Firm—Plottel & Roberts

[57] ABSTRACT

A circuit/device that can be designed into new telephone subsets as well as connected to existing telephones to prevent unwanted telephone extensions from interfering with the controlling extension. The device is operated by a single push-button located on certain or all extensions. When operated from a certain extension, it disconnects all other extensions that are fitted with the same device until such time that either the push-button at the controlling extension is operated again or the telephone is placed "on-hook." The present device has a very simple circuit located at each extension telephone and communicates over an unused yellow wire found in standard 4-wire telephone circuits.

21 Claims, 1 Drawing Sheet

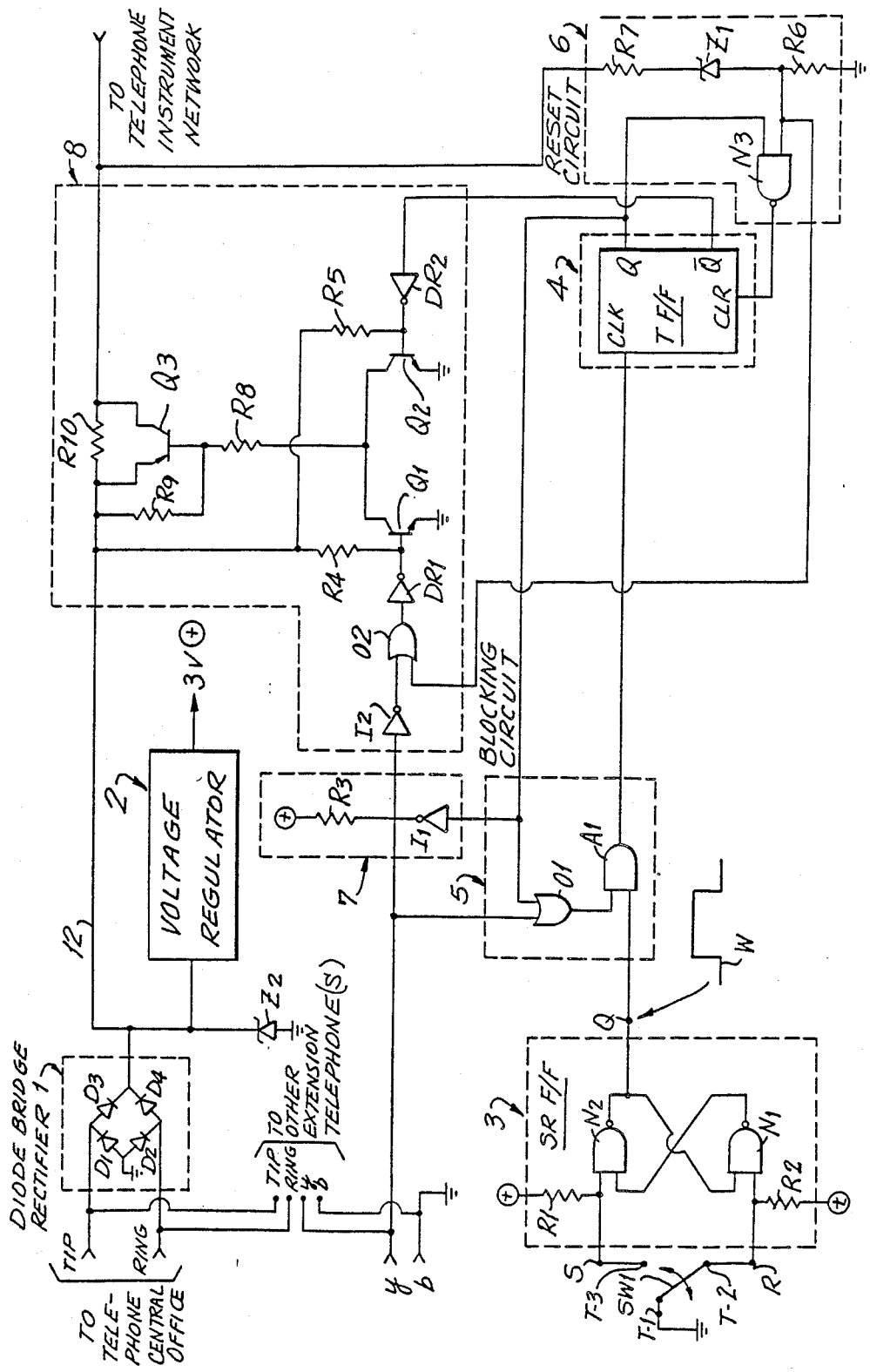

MULTI USE TELEPHONE EXTENSION CONTROL CIRCUIT AND DEVICE PROVIDING LOCKOUT FOR PRIVACY

FIELD OF THE INVENTION

The present invention relates generally to telephones and to telephone privacy circuits. For example, a subscriber who has several extensions on one telephone line, and wishes to ensure privacy of the line he is using, is able with the invention to disconnect, and reconnect if he wishes, the other extension(s) while he is using the telephone.

BACKGROUND OF THE INVENTION

The telephone is an integral part of our daily life. Most people consider it to be one of the most useful elements that make it convenient for living.

Since a telephone provides such an important communication link for us, continual efforts have been made to add efficiency and comfort as well as to eliminate any difficulties related with its use. With that object, telephones, generally categorized as wall, desk, or combination wall-desk types, available with one or more of the following features (options), are well known and in common use: Rotary Dialing, Touch Tone Dialing; Tone-Pulse Dialing; Ringer Control, on-off or flashing light; Adjustable Receiver Volume; Mute; Lighted Dial or Touch Pads; Dialed-Number Display; Redial (last number automatically dialed); Memory Dialing; Hold; Speaker Phone; Cordless Phone; Call Timer; and Multi-line Telephone.

The need for one or more of the above mentioned options depends on whether the telephone is for home, business or personal use and on customer preference.

Many times, where more than one telephone instrument is (or can be) connected to a single line, the telephone user experiences a problem because of the following reasons:

1. A child picks up a handset from another telephone instrument and interrupts the conversation. This generally occurs in the following cases:
   (a) as the phone rings the child rushes to answer the phone, picks up any handset accessible and starts talking/listening;
   (b) a child hears someone nearby talking on the phone—even though the ringer may have been off—and reaches for the extension phone.
2. A child or a pet accidentally knocks the handset from its cradle while another telephone is in use; then all the noises generated in the room by children, pets, toys, radio and TV start annoying the person(s) on the phone.
3. Sometimes the sound level significantly drops when a second handset is lifted.
4. Another person intentionally picks up a second handset for the purpose of eavesdropping.

In all the above mentioned situations, the telephone user has to ask, shout or yell at another person to ensure that the handset is replaced in its cradle and remains there for the rest of the conversation. The problem continues to annoy the telephone user when the child replaces the handset incorrectly.

Alternately, the user has to interrupt the conversation, go to retrieve the handset, restore it to its proper position and resume the conversation, but there is still no guarantee or means to avoid recurrence of the nuisance.

The more important the conversation, the more upsetting, frustrating, and even embarrassing it becomes for the user. This also results in an expensive waste of time.

Many times the phone user would like to ensure that no other person, intentionally or unintentionally, will be able to listen from another telephone.

The above mentioned problem has to be avoided. With that and additional advantages in view, applicants have made the present invention.

SUMMARY OF THE INVENTION

The invention in one embodiment includes a switch, e.g., a push-button, on the handset or on the second part of the telephone instrument. It will have two positions, on and off, disconnecting and connecting the other extensions alternately on successive touches of the button with a finger. It will operate in a semi-automatic manner. When in use, it will provide the capability of muting both transmitter and receiver of all extension phones which include this invention.

One example of the invention is a normally open circuit added to the telephone circuitry. It shall normally remain in the "off" (inactive) position thereby causing no change or deviation in the use of the telephone. In the "off" position, it will not interfere with the normal working of the telephone.

After the connection between the calling and the called parties has been made, when needed, a push-button on the invention is touched (pressed) manually once to bring it to the "on" position.

In the "on" position, the circuit places all other telephones connected to that line in non-operating, or disconnected, modes. This will provide a nuisance-free conversation without worrying about anyone eavesdropping.

Touching the push-button again—while the phone is still in use—changes it to its "off" position, returning all phones to their normal operation.

The circuit automatically returns to its "off" position when the handset is replaced in its cradle.

The circuit may be operated from any one of the extension phones in use. But when it has been placed in the "on" position once, it shall not allow any other telephone instrument on that line to be used. As soon as the push-button on the circuit is touched once again to change it to its "off" position, or when the handset of the phone in use is restored, all telephones shall revert to their normal operation.

The invention may be installed on existing telephones or incorporated in the circuitry of new telephones.

BRIEF DESCRIPTION OF THE DRAWINGS

FIG. 1 is a schematic block diagram of a preferred embodiment of the invention.

DESCRIPTION OF THE PREFERRED EMBODIMENT

A circuit is described that can be designed into new telephone subsets as well as incorporated into existing designs to prevent unwanted telephone extensions from interfering with the controlling extensions. The device is operated by a single push-button located on certain or all telephone extensions. When operated from a certain extension, it disconnects all other extensions that are fitted with the same device until such time that either the push-button at the controlling extension is operated again or when the controlling extension is placed "on-hook." The present device is a circuit located at each extension subset and communicates over the unused pair of yellow and black wires that make up a standard 4-wire telephone circuit.

Control of extensions has been done in the past by means of a central switch or PABX. The PABX has the ability to switch certain extensions ON and OFF. Key systems have the ability to effect certain operations over a group of extensions but they always need a separate power supply and typically a central control circuit. The present invention suffers from neither of these disadvantages. It draws minimal power from the line, is very simple and inexpensive to build and provides controlling power at chosen extension(s).

The present invention is one example of a simple circuit to be incorporated into the design of new telephones or used to build an external device for existing phones which, when activated by means of a push-button, will disconnect all other phone extensions, that are fitted with a similar device, on the same phone line. The extension from which this device is operated is called the controlling extension, while other extensions are called secondary extensions. This disconnection can be nullified either by a second use of the push-button or simply by replacing the controlling extension on-hook.

The control circuit/device utilizes the two extra wires (usually the yellow and black wires) that exist in addition to the tip and ring (the red and green wires) in standard telephone wiring. One of these two wires is used as common ground and the other (the controlling wire) is used to carry the controlling signal. The controlling signal is the global disconnect signal which tells all extensions to which this device is connected to be disconnected from the phone line. The device also contains an additional local circuit which maintains the controlling extension's connection to the phone line even though the secondary extensions have been disconnected.

Also contained within the device are two additional capabilities as follows. First, the device contains a blocking circuit to prevent disconnected extensions from being reconnected by pushing the button at the disconnected extension. Secondly, the device contains a reset circuit that disables the disconnection of secondary extensions by replacing the controlling extension on-hook.

The present device contains eight sub-circuits as depicted in the accompanying figure. The first sub-circuit is a bridge rectifier (1) which guarantees that the upper output wire (12) is at a higher potential than ground, irrespective of the potential direction of the tip and ring. A second sub-circuit is a voltage regulator (2) which provides a steady potential to the electronic circuits irrespective of the central office potential, line loading and so on. These circuits are used in most electronic phones and may be omitted if they are already present. A switching sub-circuit (3) provides a single high going pulse from a switch (SW1) for each push/release action of the switch. A fourth sub-circuit (4) is a toggle flip-flop that serves to hold the present state of the device. It reverses its state for each application of the switch. A fifth sub-circuit (5) is a blocking circuit that prevents disconnected extensions from being reconnected by the application of the switch at the disconnected extension. A sixth sub-circuit (6) is a reset circuit that disables the disconnection on replacing the controlling extension on-hook. A seventh sub-circuit (7) is an open drain inverting buffer that is connected to a controlling (yellow) wire (y). An eighth sub-circuit (8) is a combination of two transistors (Q1, Q2) that act as the global and local switches. Each transistor operates independently of the other and the application of a high level input to either transistors causes the current extension to be connected to the phone line. It follows that disconnection is achieved by the application of a low level input to both transistors. While transistors are used in the figure for reasons of economy, it should be obvious to those skilled in the art that other types of switches could be used.

The following terminology and conventions are used throughout this description. All circuits use positive logic, meaning that a node is said to be in the true (active) state when its level is high. A high level corresponds to whatever voltage level is needed for the technology used to implement the circuit (e.g., +3 volts). Similarly, a low level (e.g., 0 volts) represents a corresponding low voltage level. While Complementary Metal Oxide Semiconductor (CMOS) technology is used to implement the preferred embodiment for reasons of minimizing the current drawn from the central office, the present disclosure is by no means restricted to such technology.

A NAND gate is a device whose output remains at a logical high state as long as at least one of its inputs is at a logical low state. Its output is set to a logical low state if both of its inputs are at a logical high state.

An AND gate is a device whose output remains at a logical low state as long as at least one of its inputs is at a logical low state. Its output is set to a high state if both its inputs are at a high state.

An OR gate is a device whose output remains at a high state if either one of its inputs is at a high state. Its output is set to a low state if both its inputs are at a low state.

A Set-reset (SR) flip/flop (F/F) (3) has two NAND gates (N1, N2) wired as shown such that its output is set to a high state by the application of a low state at its S input and is set to a low state by the application of a low level signal at its R input. The application of a high level input to both its S and R inputs causes the output to retain its previously attained state.

A toggle (T) F/F (4) is a circuit that changes (reverses) its state for each application of a high-low transition to its clock (CLK) input. The presence of a low level signal at its clear (CLR) input forces the output to go to and stay at a low state irrespective of any signal being present at its clock input.

FIG. 1 is a circuit diagram of the preferred embodiment suitable for incorporating in new designs or building into external add-on devices for existing phones. It is assumed that a connection to the telephone is made using the Tip and Ring. The central office supplies a 48 v battery feed over tip and ring to power telephone circuits. The preferred embodiment uses this power feed to supply electrical power to its circuits.

The Diode Bridge Sub-circuit (1) is used since in certain telephone wiring, the polarity of tip and ring are reversed. No assumptions can therefore be made about the polarity of tip and ring. The bridge rectifier circuit has diodes (D1, D2, D3, and D4) which provide a definitive potential difference across its output irrespective of a possible polarity reversal across tip and ring. In situations where there is no ambiguity of the tip and ring potential, the diode bridge may be omitted.

The Voltage Stabilizer Sub-circuit (2), receives the output of the bridge rectifier circuit (1) which is guaranteed to be such that the upper lead of its output is at a higher potential than its lower lead. The actual voltage between these two leads is a function of the central office battery feed, the distance of the telephone from the central office, the number of extensions connected in parallel and so on. In order to provide a constant operation potential for the electronic circuits in FIG. 1, a voltage stabilizer device (2) is connected to the output of the bridge rectifier. The output of the voltage stabilizer is set to the power supply voltage appropriate to the technology used for the implementation. For example, in the case of high speed CMOS (HC), the output could be set in the range of 3 V to 6 V.

The switching sub-circuit (3) has a push-button switch (SW1) and a debouncing circuit. The switch is of the Single pole-double throw (SPDT) type. In its normal position, it makes contact between the common terminals T-1 and the lower terminal T-2. When the switch is manually depressed, the terminal T-1 is disconnected from terminal T-2 and is connected to terminal T-3 while the switch is held in the depressed position. Upon release of the switch, terminal T-1 is disconnected from terminal T-3 and is reconnected to terminal T-2.

When mechanical switches are used to control electronic circuits, a commonly observed problem is that of bounce. In the case of the SPDT switch described above, depressing the switch may cause several make and break connections between terminals T-1 and T-2 before disconnection is finally established. Similarly several make and break connections may take place between terminals T-1 and T-3 before connection is finally established. Since this bounce is an undesirable phenomenon, a debouncing circuit consisting of the SR flip/flop (F/F) 3 is utilized. The SR F/F is normally in the Reset (R) state because its R input is grounded by the SPDT switch, holding it low. The S input is at a logical high state because of a pullup resistor R1. This results in output Q of the F/F to be held in the low state. When the switch is depressed, the bounce at the R input does not present a bounce at output Q because the F/F experience a change in output only when its other input is set to a low state. When a contact is finally made with terminal T-3 by switch SW1, the R input to the F/F is guaranteed to be in the logical high state by the presence of resistor R2. This contact with terminal T-3 causes the F/F output Q to change its state to a logical high. It follows that when the switch is released, the output Q goes back to its logical low state. The debouncing circuit thus has the effect of converting a single switch depressing and releasing action accompanied by bounce into a single low to high and high to low transition at the output Q free of bounce. This pair of transitions is called a high going pulse and is used in the remainder of the circuit. The wave form of an output pulse at output Q when the switch SW1 is depressed is shown with legend W.

The toggle circuit 4 has a single T F/F connected so that with the application of a negative going high to low transition at its clock input CLK, the output Q reverses its state. This state reversal is called a toggle. Since the output of the SR F/F is connected to the CLK input, it follows that the output of the toggle circuit will reverse its state for each high to low transition at the output of SR F/F caused by the depress/release action of switch SW1. The output Q of the toggle circuits forms the controlling signal through sub-circuit (7) described below. When the switch SW1 is depressed and released once, this output goes high and stays high. This high state causes the device to operate. When the switch is operated again, this output goes back to the low state, causing the device to become inoperative.

The blocking circuit (5) has an AND gate A1 and an OR gate O1 and is used to prevent (block) the high going pulse from the SR F/F from reaching the T F/F and thus having any effect on the rest of the circuit. In the case where the current extension has been disabled by the controlling extension, the yellow wire (y) is at a low level as described later. Since the current secondary extension is not the controlling extension, the output of the T F/F is also at a logical low level. The output of O1 is thus also at a low level. This holds the output of A1 at a low level and prevents the high going pulse at the output of the SR F/F from being presented to the CLK circuit of the T F/F. Thus pushing the push-button at the secondary extension has no effect.

The reset circuit (6) operates to disable the disconnection of secondary extensions when the controlling extension is replaced on-hook. It has resistors R6 and R7, zener diode Z1 and NAND gate N3. When the controlling extension is on-hook, the potential difference across the series combination of R6, Z1 and R7 exceeds the break-down voltage of Z1, causing current to flow through it and R6, keeping the voltage across it high enough to present a logical high level to one input of N3. When the controlling extension is off-hook, the potential difference across the series combination is below the break-down voltage of Z1 preventing any current from flowing through it and R6. A logical low level is thus presented to the input of N3. When the controlling extension is operated to disconnect secondary extensions, the output of the T F/F 4, is high, presenting a high level to one input of N3. If the controlling extension is now replaced on-hook, presenting a high level input to the other input of N3, both inputs being high the output of N3 goes to a low state, resetting the T F/F 4, to a low state. The device is thus disabled simply by replacing the controlling extension on-hook. Note that both of the following conditions have to be met for this reset to take place. First, the device has to be activated by a push/release action of the push-button. Secondly, the controlling extension has to be placed on-hook while active. In other situations, the reset circuit has no effect upon the operation of the device.

The Open Drain Buffer Sub-circuit (7) is such that when the input is set to a logical low state, the output goes to a logical high state and vice-versa. An advantage of this circuit is that the outputs of several such open drain circuits can be connected together and the resultant connection will retain the logical high level, by means of a pull-up Resistor R3, only as long as all of the corresponding outputs are high and will immediately achieve the logical low level if any of the outputs go to a logical low level. It should be noted that while any of the inputs of these open collector buffers going to logical high level would cause the joint output to go to a logical low level, this change would not affect the other inputs to the open collector buffers. This fact is used advantageously by the present device because the joint output is the controlling terminal described below.

The Local and Global Transistor Switching Sub-circuits (8) has transistors Q1 (called the global transistor switch) and Q2 (called the local transistor switch).

Drivers DR1 and DR2 are open drain inverting drivers that provide the current necessary to turn Q1 and Q2 ON and are considered to be a part of Q1 and Q2 for the rest of this document. Resistors R4 and R5 are pull up resistors for the open drain drivers DR1 and DR2. When the output of the T F/F (4) goes to a high state, the open drain buffer output is set to a low state, immediately switching off Q1 at all extensions. At the same time Q2 is turned ON at the controlling extension thereby enabling reconnection at the controlling extension. Thus all extensions except the controlling extension are disconnected from the phone line. As noted earlier, at least one of Q1 and Q2 is required to be turned ON to enable connection to the phone line. In this situation, the potential difference across the collector-emitter terminals of the Q1/Q2 pairs is low enough that transistor Q3 is turned ON, enabling current to flow through it, the speech circuits and back to ground. Resistor R8 limits the current drawn by Q1 and Q2 so as not to load the battery feed any more than necessary. Resistor R9 ensures that Q3 is turned OFF when Q1 and Q2 are both OFF, while resistor R10 leaks a small amount of current around Q3 when Q3 is OFF to allow any semiconductor memories at secondary extensions to hold their acquired state even when disconnected by Q3. In addition, R10 allows ringing voltage to be presented to the telephone even when Q3 is off. When both transistors are OFF, as in the case of secondary extensions, Q3 is held OFF and the secondary extension is effectively disconnected.

When all extensions are on-hook, current flows through R6 as described earlier. This presents a high level input to O2, causing its output to go high which switches Q1 off. This ensures that all global transistors Q1 are off when the phone line is not in use; this minimizes the central office current drain through R8. When any one of the extensions is now placed off-hook, no current flows through R6, presenting a low level input to O2. This allows the controlling wire to switch global transistors on or off.

In addition to the red and green (the tip and ring) connections from the central office, there exist two additional wires y and b usually colored yellow and black that connect each extension telephone but are not connected to the central office. The present device uses these two wires in the following way. The black wire is a reference ground that is used by each extension so that individual high and low level signals at each extension are compatible. The yellow wire is the controlling wire. A low level at this control wire effected by any of the extensions causes all the global transistors to be switched OFF, causing an immediate disconnection of all extensions except at the extension which caused this operation because the local transistor at this controlling extension also operates simultaneously, causing reconnection.

The device described in this disclosure operates in the following manner. When the device is not operational, the controlling wire y is at a high level causing the global transistor Q1 at each extension to be ON, enabling Q3 and connection of all extensions.

A single push/release action of switch SW1 at any of the extensions while they are off-hook causes a high going pulse at the output of the SR F/F 3. This causes the T F/F to toggle, which in turn has the effect of setting the controlling wire y to a low state. The global transistors Q1 at all extensions including the controlling extension are thus turned OFF. However the T F/F 4 being at a low logical state at the $\overline{Q}$ output turns the local transistor Q2 ON. Thus, at all secondary extensions, the global and local transistors are both OFF, thereby providing no current through the corresponding speech circuits. The speech circuits at secondary extensions are thus disconnected from the phone line. At the controlling extension, however, the global transistor Q1 is OFF, but the local transistor Q2 is ON, enabling current through the speech circuits at this extension. The controlling extension is thus unaffected by the operation of the device.

While the secondary extension is disconnected, the blocking circuit 5 prevents the push-button at the secondary extension from having any effect. Thus secondary extensions can only be reconnected by action taken at the controlling extension.

When the push-button SW1 at the controlling extension is again activated, the SR F/F 3 output is pulsed again, causing the T F/F 4 to revert to the low state. This causes the open drain inverter $I_1$ output, and hence the controlling yellow wire y to go to a high state, thus effecting all transistors Q1 on, and Q3 on, and a reconnection at all extensions. Simultaneously with this operation, the local transistor Q2 at the controlling extension is turned OFF by T F/F 4 output $\overline{Q}$ going high. The transistor Q2 is no longer needed to enable the controlling extension to operate, because transistor Q1 is ON.

If the controlling extension is placed on-hook before the second activation of the switch, the reset circuit 6 causes the T F/F 4 to be set to a low state. All extensions are thus reconnected as indicated above.

While many different designs and choices of components may be used, the following list of components have been built to make an operable circuit and are found quite satisfactory:

Full wave bridge rectifiers D1, D2, D3, D4: 200 volts (peak inverse voltage)

Zener Z2: 90 volts. In the voltage regulator sub-circuit 2, resistor 74 kilo ohms (series) and Zener 5.1 volts (parallel) capacitor 100 microfarads, 10 volt.

Resistors R1 and R2: each 220 kilo ohms

Gates N1 and N2 are both one-fourth of NAND gate 74HC00

In the toggle sub-circuit 4, the toggle flip/flop is one-half of a 74HC73

In the blocking circuit 5, gate A1 is one-fourth of a NAND gate 74HC00 and one-fourth of 74HC02

OR gate O1 is one-fourth of a 74HC02 and one-fourth of the 74HC02

In the reset circuit 6, N3 is one-fourth of a 74HC00 NAND gate; R6: 100 kilo ohms; R7: 470 kilo ohms; Z1: 15 volts In the open drain buffer sub-circuit 7, $I_1$ is one-quarter of a 74HC03 open drain inverter In the switching sub-circuit 8 drivers DR1 and DR2 are one-quarter of a 74HC03. Transistors Q1 and Q2 are type 2N2222 or 2N4401. Q3 is a 2N4403. OR gate O2 is one-fourth of a 74HC02 and one-fourth of the 74HC02. I2 is one-quarter of 74HC02.

Resistors:
R3: 220 kilo ohms
R4: 220 kilo ohms
R5: 220 kilo ohms
R8: 56 kilo ohms
R9: 470 kilo ohms
R10: 100 kilo ohms.

What is claimed is:

1. A control circuit for connection to the talking path of a telephone comprising
   a switch (SW1, 3) for providing a pulse to a first gate (A1),
   a flip/flop (4) connected to receive a pulse from said first gate and to be switched thereby to a first state with a signal on a first output (Q),
   said output being connected to said first gate (A1) and enabling said gate when said flip/flop is in said first state,
   a switch circuit (8) having a controlling input (DR2) connected to said flip/flop output, and a controlling path (Q3) connectible in a talking path of a telephone, said switching circuit normally providing a talking path, and interrupting said path in response to said flip/flop output,
   a terminal (y) connected to said switching circuit, for rendering said switching circuit in an interrupted talking state (I2/O2/DR1 or Q1 and Q3 both off) when a signal is received thereon from outside the control circuit,
   said terminal (y) also being connected to said flip/flop output (Q) and adapted to be connected to an external circuit for controlling said external circuit, and
   a reset circuit (6) connected to said flip-flop (4) to switch said flip/flop into a second state in response to a signal that said telephone has gone from off-hook to on-hook.

2. A circuit according to claim 1 wherein said terminal (y) is connected to said first gate (A1), and when an external signal is received on said terminal said external signal disables said gate, and prevents any pulses from said switch (SW1, 3) from being transmitted through said first gate.

3. A control circuit according to claim 1 wherein said switch (SW1, 3) comprises a push-button single pole double throw switch (SW1), and a debouncing circuit (3) which is a set/reset flip/flop, the output of said set/reset flip/flop is connected to said first gate (A1), and set and reset input to said flip/flop (3) are connected to the double throw terminals respectively of said switch, whereby undesirable bounce within said switch is removed by said flip/flop which provides a clean pulse at its output.

4. A control circuit according to claim 1 wherein said first gate comprises an AND gate.

5. A control circuit according to claim 1 wherein said flip/flop (4) is a toggle flip/flop having a clock input (CLK) connected to receive the output from the first gate (A1) whereby successive pulses generated by operation of said switch (SW1) successively switch said flip/flop into its first state, and then into a second state, and then back to said first state, and repetitively, whereby said control circuit may be activated and deactivated by successive operations of said switch SW1.

6. A circuit according to claim 1 wherein said flip/flop output connection to said first gate (A1) comprises a second gate (O1) in said connection, said second gate having one input from said flip/flop output, and a second input to said terminal (y).

7. A circuit according to claim 6 further comprising an inverter $I_1$ connected between said flip/flop output and said second input of said second gate.

8. A circuit according to claim 4 wherein said AND gate is enabled by said signal from said flip/flop output and is disabled by an external signal applied on said terminal (y).

9. A circuit according to claim 1 wherein said switch circuit (8) comprises
   first and second transistors (Q1 and Q2),
   a third transistor (Q3) having its emitter and collector connected in series with said talking path and a base connected in series with said first and second transistors,
   said first transistor being connected to and controlled by said signals on said terminal (y, via I2, O2 and DR1),
   said second transistor being connected to said controlling input (DR2) of said switch,
   whereby when said flip/flop (4) is switched to said first state, one of said first and second transistors is turned off and the other on, thus making said third transistor conducting and said talking path conducting, and
   when said flip/flop (4) is not switched, one of said first and second transistors is off (Q2); and in the absence of an external signal on said terminal (y) the other of said first and second transistors (Q1) is on and said third transistor is conducting and said talking path is conducting while in the presence of an external signal said other transistor (Q1) is off, thus rendering said third transistor (Q3) nonconducting and blocking said talking path.

10. A circuit according to claim 9 wherein a high impedance (R10) is in parallel with the emitter and collector of the third transistor (Q3) to permit charging of any circuits in the telephone and to permit ringing voltage to reach the telephone set.

11. A circuit according to claim 9, further comprising an inverter $I_1$ connected between said first output (Q) of said flip/flop (4) and the base of said first transistor (Q1) via I2, O2 and DR1.

12. A circuit according to claim 11 wherein said inverter is an open drain buffer inverter with the characteristics that the outputs of several such open drain circuits can be connected together (as will occur through several circuits being interconnected through the y connection) and the result connection will maintain the logical high level only as long as all of the corresponding output have a common logical high level and will immediately achieve logical reverse level if any of the outputs were to go to the reverse level.

13. A circuit according to claim 1 wherein said reset circuit (6) comprises a series connected voltage divider and zener diode (R6, R7 and Z1) connected across a reference voltage and said telephone talking path, an output of said voltage divider being connected to both a reset input of said flip/flop and an input of O2.

14. A circuit according to claim 13 wherein when all extensions are on-hook, said OR gate O2 output will go high rendering all global transistors Q1 off.

15. A circuit according to claim 13 wherein said connection from said voltage divider is through a gate having a second input from said first output of said flip/flop (4) which enables said gate, whereby when said flip/flop is activated and in a first state, and the telephone goes from on-hook to off-hook, the signal from the voltage divider is passed through the gate to a clear terminal of the flip/flop and returns said flip/flop to a second state.

16. A circuit according to claim 1 further comprising a voltage rectifier (1) and a voltage regulator (2), said voltage rectifier being adapted to be connected across a tip and ring connection of a telephone line, and said voltage regulator connected to an output of said rectifier for providing the needed voltages for driving the circuit.

17. A circuit according to claim 1 wherein said terminal (y) is adapted to be connected to a third wire in the normal 4-wire telephone wiring.

18. A circuit comprising
an input for connection to tip and ring wires of an incoming telephone line, and to a third wire,
an output for connection to a telephone set,
an operator operative switch for operating a toggle,
a toggle which when in its normal position provides a first signal to said third wire connection, and when operated by said operator operative switch provides a second signal to said third wire connection,
a signal operated switch connected between said input and said output for making and blocking a connecting path of voice signal from said input to said output in accordance with said first and second signals, and having a first control input connected to said third wire connection and operable by said second signal to block said connecting path, and operable by said first signal to make said connecting path, and having a second control input connected to said toggle for receiving said second signal which overrides any signal on said first control input and renders said voice signal path in the connection made state,
whereby when two of said circuits are connected between a single telephone line input and two telephone sets with one circuit in series with each telephone, and with the tip and ring inputs connected to the telephone line and a third wire between the two circuits, and with the circuit outputs to the respective telephone sets, then upon an activation of the operator operative switch of one circuit, there is a disconnection by the other circuit of the speaking path to the second telephone set.

19. A circuit according to claim 18 wherein said toggle when in said operated position and said second telephone set in said disconnected position, a subsequent operation of said toggle on the second telephone set renders no effect on the circuit of the speaking path of said first telephone set.

20. A circuit according to claim 18 wherein said toggle when in said operated position and said operator operative switch is again activated, said toggle reverts to its normal position providing a first signal on said third wire connection whereby said second telephone is reconnected in the speaking path of said telephone line.

21. A circuit according to claim 18 wherein said toggle comprises a reset input connected to said circuit output, and receives thereon a reset signal that returns said toggle to its normal state when said toggle has been operated and said circuit is in a telephone line and when said telephone returns to on-hook.

* * * * *